US007526860B2

(12) United States Patent
Kojima

(10) Patent No.: US 7,526,860 B2
(45) Date of Patent: May 5, 2009

(54) METHOD OF MANUFACTURING NOZZLE PLATE, LIQUID EJECTION HEAD, AND IMAGE FORMING APPARATUS COMPRISING LIQUID EJECTION HEAD

(75) Inventor: Toshiya Kojima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 410 days.

(21) Appl. No.: 11/358,033

(22) Filed: Feb. 22, 2006

(65) Prior Publication Data

US 2006/0187259 A1 Aug. 24, 2006

(30) Foreign Application Priority Data

Feb. 23, 2005 (JP) ............................ 2005-047564

(51) Int. Cl.
*B23P 19/00* (2006.01)
*B41J 2/135* (2006.01)

(52) U.S. Cl. ............................ 29/743; 347/44; 347/45

(58) Field of Classification Search .................. 29/743, 29/DIG. 44, DIG. 78; 347/44, 45
See application file for complete search history.

(56) References Cited

U.S. PATENT DOCUMENTS

| | | | | |
|---|---|---|---|---|
| 3,668,002 | A * | 6/1972 | Okabe et al. | 427/124 |
| 4,272,612 | A * | 6/1981 | Oliver | 430/323 |
| 4,405,878 | A * | 9/1983 | Oliver | 313/346 R |
| 4,728,392 | A * | 3/1988 | Miura et al. | 216/27 |
| 4,857,382 | A * | 8/1989 | Liu et al. | 428/156 |
| 4,908,096 | A * | 3/1990 | Zupancic | 216/49 |
| 5,110,393 | A * | 5/1992 | Sumi et al. | 156/344 |
| 5,112,448 | A * | 5/1992 | Chakravorty | 205/118 |
| 5,212,496 | A * | 5/1993 | Badesha et al. | 347/45 |
| 5,773,553 | A * | 6/1998 | Fuller et al. | 528/170 |
| 6,228,511 | B1 * | 5/2001 | Sachdev et al. | 428/626 |
| 6,485,625 | B1 * | 11/2002 | Simpson et al. | 204/601 |
| 6,747,718 | B2 * | 6/2004 | Kanou et al. | 349/113 |
| 6,815,085 | B2 * | 11/2004 | Appelt et al. | 428/626 |
| 6,895,659 | B2 * | 5/2005 | Moon et al. | 29/611 |
| 6,984,024 | B2 * | 1/2006 | Shin et al. | 347/56 |
| 6,988,792 | B2 * | 1/2006 | Koike et al. | 347/71 |
| 7,275,817 | B2 * | 10/2007 | Clark et al. | 347/93 |
| 7,326,524 | B2 * | 2/2008 | Kitahara et al. | 430/320 |

FOREIGN PATENT DOCUMENTS

| | | | |
|---|---|---|---|
| JP | 7-304175 A | | 11/1995 |
| JP | 2004-122384 | * | 4/2004 |
| JP | 2004-142297 A | | 5/2004 |

* cited by examiner

*Primary Examiner*—David P Bryant
*Assistant Examiner*—David P Angwin
(74) *Attorney, Agent, or Firm*—Birch, Stewart, Kolasch & Birch, LLP

(57) ABSTRACT

The method of manufacturing a nozzle plate, comprises the steps of: providing a liquid-repelling film on a first surface of a nozzle plate having a nozzle for ejecting liquid; then performing semi-curing of the liquid-repelling film; then providing a mask having a mask hole corresponding to the nozzle, on the liquid-repelling film; then forming a film hole in the liquid-repelling film by blowing a removing element to the liquid-repelling film; then removing the mask; and then performing full-curing of the liquid-repelling film.

11 Claims, 10 Drawing Sheets

METHOD OF MANUFACTURING NOZZLE PLATE, LIQUID EJECTION HEAD, AND IMAGE FORMING APPARATUS COMPRISING LIQUID EJECTION HEAD

BACKGROUND OF THE INVENTION

1. Field of the Invention

The present invention relates to a method of manufacturing a nozzle plate, a liquid ejection head, and an image forming apparatus including a liquid ejection head, and more particularly, to technology for forming a liquid-repelling film on the surface of a nozzle plate in which a plurality of very fine liquid ejection ports (nozzles) for ejecting liquid are formed, and to a liquid ejection head and an image forming apparatus using a nozzle plate.

2. Description of the Related Art

An inkjet printer (inkjet recording apparatus) is known as an image forming apparatus. The inkjet recording apparatus includes an inkjet head (liquid ejection head) where a plurality of nozzles (ejection ports) for ejecting ink (liquid) are arranged, and forms an image on a recording medium by ejecting ink from the nozzles while the inkjet head and the recording medium are caused to move relatively to each other.

Various methods are known as ink ejection methods for an inkjet recording apparatus. For example, a piezoelectric method is known, in which a diaphragm that constitutes a portion of the pressure chambers is deformed and the volume of the pressure chamber is changed by the deformation of a piezoelectric element. Thereby, ink is introduced into the pressure chamber from an ink supply passage when the volume of the pressure chamber is increased, whereas the ink inside the pressure chamber is ejected from the nozzles in the form of ink droplets when the volume of the pressure chambers is decreased.

In an inkjet recording apparatus of this kind, by forming a liquid-repelling film on the surface of the nozzle plate in which the nozzles of the ink ejection head are formed, soiling of the nozzles can be removed more readily, leakage of ink from the nozzles is reduced, and the direction and volume of ejection of the ink can be stabilized.

In order to form both nozzle apertures and a liquid-repelling film, broadly speaking, there is a method of forming a liquid-repelling film after forming nozzle holes in the nozzle plate, and a method of forming nozzle holes after forming a liquid-repelling film on one surface of the nozzle plate.

Of these methods, in the case of a method of forming the nozzle holes afterwards, the method for forming the holes is, in practice, limited to a method of laser processing of a heat resistant resin, such as polyimide, (using an excimer laser, for example), and hence there are restrictions on the types of device used to form the holes. Therefore, the method where the liquid-repelling film is formed after forming the nozzle holes is used more frequently, in general.

However, in the method of forming a liquid-repelling film afterwards, it is difficult to leave the liquid-repelling film in an orderly shape around the perimeter of each nozzle, and therefore various methods of manufacturing a nozzle plate have been proposed.

For example, Japanese Patent Application Publication No.7-304175 discloses a method for manufacturing a nozzle plate having a liquid-repelling film formed around the periphery of each nozzle. In this method, nozzles are formed in a substrate, and a liquid-repelling film is formed on the surface of a substrate surrounding the positions where the nozzles have been formed. Then, blast processing is carried out to cause minute solid particles to impact to the liquid-repelling film from the rear side of the surface of the substrate on which the liquid-repelling film is formed, thereby removing the unwanted portions of the liquid-repelling film. In this method, after blast processing, burring arises toward the side exterior to the nozzles, and this burr is heated to be softened and removed.

The method using the above-described blast process can lead to the enlargement of the nozzle diameter, deformation of the actual nozzle plate, roughening of the nozzle plate surface, and the like. In view of these, Japanese Patent Application Publication No. 2004-142297 discloses a method of manufacturing a nozzle plate in which nozzle holes are formed in a nozzle plate, a liquid-repelling film is formed on the surface of the nozzle plate, and the liquid-repelling film in the positions where the film blocks the nozzle holes up is removed according to a so-called water jet that water is sprayed onto the liquid-repelling film from the rear face of the plate.

However, if it is sought to remove unwanted portions of the liquid-repelling film formed on the surface of a nozzle plate by means of the blast process or water spray from the rear face of the nozzle plate, as described above, then there is a possibility of removing parts of the liquid-repelling film that do not need to be removed, and hence it is difficult to keep the accuracy of the nozzle plate.

Furthermore, since the film is removed by the impact of the blast material or water, the liquid-repelling film and the nozzle plate themselves may deform, or internal stresses may be generated therein.

SUMMARY OF THE INVENTION

The present invention has been contrived in view of the foregoing circumstances, an object thereof being to provide a method of manufacturing a nozzle plate, a liquid ejection head, and an image forming apparatus including a liquid ejection head, whereby occurrence of burring is prevented during nozzle formation, a hole shape is formed with a high degree of accuracy, and damage of a liquid-repelling member is reduced.

In order to attain the aforementioned object, the present invention is directed to a method of manufacturing a nozzle plate, comprising the steps of: providing a liquid-repelling film on a first surface of a nozzle plate having a nozzle for ejecting liquid; then performing semi-curing of the liquid-repelling film; then providing a mask having a mask hole corresponding to the nozzle, on the liquid-repelling film; then forming a film hole in the liquid-repelling film by blowing a removing element to the liquid-repelling film; then removing the mask; and then performing full-curing of the liquid-repelling film.

Preferably, in the film hole forming step, the removing element is blown from an opposite side of the nozzle plate to the first surface. According to these aspects of the invention, it is possible to remove only the liquid-repelling film corresponding to the location where the liquid-repelling film is to be removed, thereby forming the hole with good accuracy. Hence it is possible to form the hole having a accurate hole shape, without the occurrence of burring.

Preferably, if $D_1$ represents a diameter of the nozzle hole of the nozzle and $D_2$ represents a diameter of the mask hole of the mask, then the following relationship is satisfied: $D_2<D_1$. According to this aspect, the hole formed in the liquid-repelling film with a tapered shape is formed. Accordingly, the liquid meniscus can be held more readily in the nozzles, the ejection of liquid is stabilized, and high-frequency ejection becomes possible.

Alternatively, it is also preferable that in the film hole forming step, the removing element is blown from a side of the first surface. According to this aspect of the invention, it is possible to remove only the liquid-repelling film corresponding to the location where the liquid-repelling film is to be removed, thereby forming the hole with good accuracy. Hence it is possible to form the hole having a accurate hole shape, without the occurrence of burring.

Preferably, if $D_1$ represents a diameter of the nozzle hole of the nozzle and $D_2$ represents a diameter of the mask hole of the mask, then the following relationship is satisfied: $D_2>D_1$. According to this aspect, the hole formed in the liquid-repelling film with a tapered shape is formed. Accordingly, the liquid meniscus can be held more readily in the nozzles, the ejection of liquid is stabilized, and high-frequency ejection becomes possible.

Preferably, if $D_1$ represents a diameter of the nozzle hole of the nozzle, $D_2$ represents a diameter of the mask hole of the mask, $t_0$ represents a thickness of the liquid-repelling film, and $t_1$ satisfies $t_1=|D_1-D_2|/2$, then the following relationship is satisfied: $t_1/t_0 \leqq 1$. According to this aspect, the strength of the tapered section of the liquid-repelling film is ensured, and the flight characteristics of the ejected liquid can be improved.

Preferably, a material of the nozzle plate is a metal or a semiconductor. According to these aspects, the hole can be selectively formed in the liquid-repelling film only.

Preferably, the removing element is a micro-particle or fluid. Preferably, the fluid is at least one of an air, a nitrogen gas, and an inert gas. According to these aspects, it is possible to suppress damaging of the base material of the liquid-repelling film.

In order to attain the aforementioned object, the present invention is also directed to a liquid ejection head comprising a nozzle plate manufactured by the above-described method.

In order to attain the aforementioned object, the present invention is also directed to an image forming apparatus comprising the above-described liquid ejection head. p According to these aspects of the invention, the flight-characteristics of the liquid are improved and high-frequency ejection becomes possible, and thereby image of high quality can be formed in an efficient manner.

As described above, according to the method of manufacturing a nozzle plate, the liquid ejection head, and the image forming apparatus including the liquid ejection head according to the present invention, in the process of manufacturing a nozzle plate, it is possible to form a hole with good accuracy, only in the position where liquid-repelling film is to be removed, and the hole shape can be accurately formed, without the occurrence of any burring. By using the nozzle plate formed in this way, images of high quality can be formed in an efficient manner.

BRIEF DESCRIPTION OF THE DRAWINGS

The nature of this invention, as well as other objects and benefits thereof, is explained in the following with reference to the accompanying drawings, and wherein.

DETAILED DESCRIPTION OF THE PREFERRED EMBODIMENTS

Figure 1:
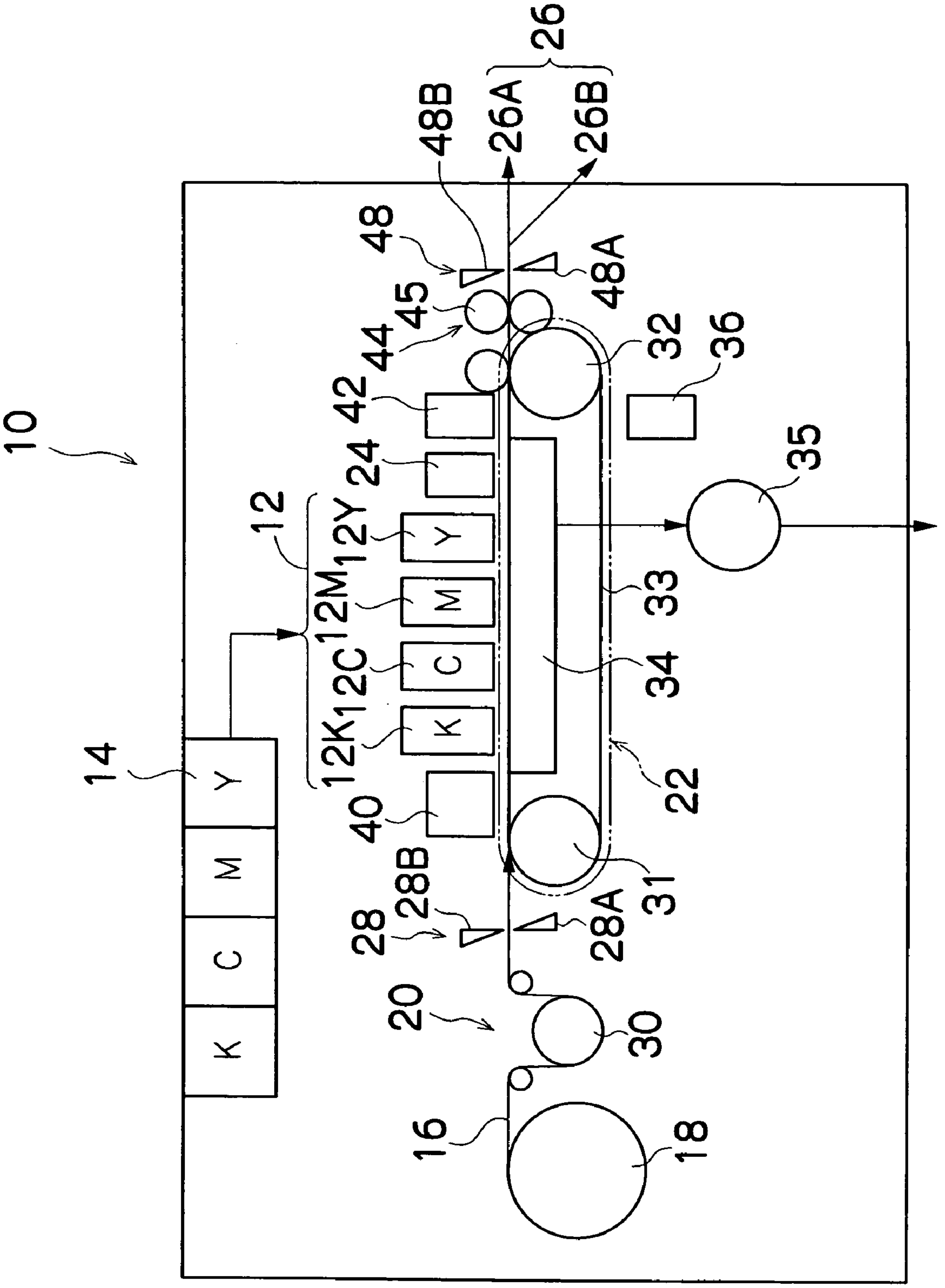
FIG. 1 is a general schematic drawing of one embodiment of an inkjet recording apparatus forming an image forming apparatus according to the present invention.

FIG. 1 is a general schematic drawing showing an approximate view of a first embodiment of an inkjet recording apparatus forming an image forming apparatus having a liquid ejection head relating to the present invention.

As shown in FIG. 1, the inkjet recording apparatus 10 includes: a printing unit 12 having a plurality of print heads (liquid ejection heads) 12K, 12C, 12M, and 12Y for ink colors of black (K), cyan (C), magenta (M), and yellow (Y), respectively; an ink storing and loading unit 14 for storing inks of K, C, M and Y to be supplied to the print heads 12K, 12C, 12M, and 12Y; a paper supply unit 18 for supplying recording paper 16; a decurling unit 20 for removing curl in the recording paper 16 supplied from the paper supply unit 18; a suction belt conveyance unit 22 disposed facing the nozzle face (the surface of the nozzle plate formed with nozzles for ejecting ink) of the printing unit 12 while conveying the recording paper 16 while keeping the recording paper 16 flat; a print determination unit 24 for reading the printed result produced by the printing unit 12; and a paper output unit 26 for outputting printed recording paper (printed matter) to the exterior.

In FIG. 1, a magazine for rolled paper (continuous paper) is shown as an example of the paper supply unit 18; however, more magazines with paper different in such as paper width and quality may be jointly provided. Moreover, papers may be supplied with cassettes that contain cut papers loaded in layers and that are used jointly or in lieu of the magazine for rolled paper.

In the case of a configuration in which roll paper is used, a cutter 28 is provided as shown in FIG. 1, and the roll paper is cut to a desired size by the cutter 28. The cutter 28 includes a stationary blade 28A whose length is not less than the width of the conveyor pathway of the recording paper 16, and a round blade 28B which moves along the stationary blade 28A. The stationary blade 28A is disposed on the reverse side of the printed surface of the recording paper 16, and the round blade 28B is disposed on the printed surface side across the conveyance path. When cut paper is used, the cutter 28 is not required.

In the case of a configuration in which a plurality of types of recording paper can be used, it is preferable that an information recording medium such as a bar code and a wireless tag containing information about the type of paper is attached to the magazine. By reading the information contained in the information recording medium with a predetermined reading device, the type of paper to be used is automatically determined, and ink-droplet ejection is controlled so that the ink-droplets are ejected in an appropriate manner in accordance with the type of paper.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite to the curl direction in the magazine. The heating temperature at this time is preferably controlled so that the recording paper 16 has a curl in which the surface on which the print is to be made is slightly round outward.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a plane (flat plane).

The belt 33 has a width that is greater than the width of the recording paper 16, and a plurality of suction openings (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. A negative pressure is generated by sucking air from the suction chamber 34 by means of a fan 35, and thereby the recording paper 16 on the belt 33 is held by suction.

The belt 33 is driven in the clockwise direction in FIG. 1 by the motive force of a motor (not shown) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning-rollers different from that of the belt 33 to improve the cleaning effect.

The inkjet recording apparatus 10 can include a roller nip conveyance mechanism, in which the recording paper 16 is pinched and conveyed with nip rollers, instead of the suction belt conveyance unit 22. However, in the roller nip conveyance mechanism, there is a possibility that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed before the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
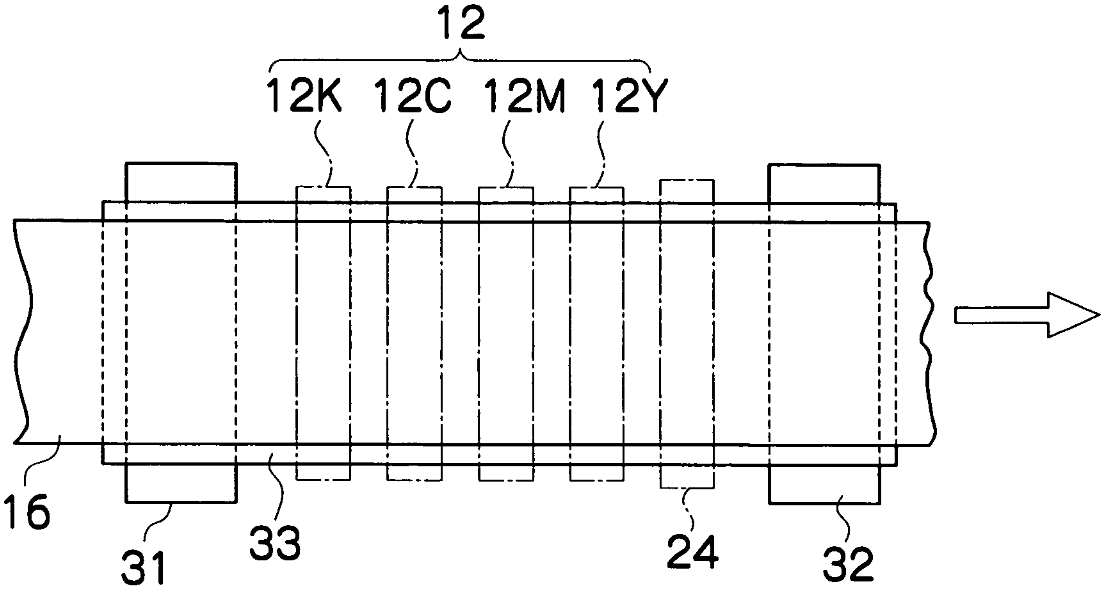
FIG. 2 is a plan view of the principal part of the peripheral area of a printing unit in the inkjet recording apparatus illustrated in FIG. 1.

The printing unit 12 is a type of a so-called "full line head" in which a line head having a length corresponding to the maximum paper width is arranged in a direction (main scanning direction) which is perpendicular to the paper conveyance direction (sub-scanning direction) (see FIG. 2).

As shown in FIG. 2, each of the print heads 12K, 12C, 12M, and 12Y is constituted by a line head in which a plurality of ink ejection ports (nozzles) are arranged throughout a length that exceeds at least one side of the maximum-size recording paper 16 intended for use in the inkjet recording apparatus 10.

The print heads 12K, 12C, 12M, and 12Y are arranged in the order of black (K), cyan (C), magenta (M), and yellow (Y) from the upstream side (left side in FIG. 1), along the conveyance direction of the recording paper 16 (paper conveyance direction). A color image can be formed on the recording paper 16 by ejecting the inks from the print heads 12K, 12C, 12M, and 12Y, respectively, onto the recording paper 16 while the recording paper 16 is conveyed.

The printing unit 12, in which the full-line head covering the entire width of the paper are thus provided for each of the ink colors, can record an image over the entire surface of the recording paper 16 by performing the action of moving the recording paper 16 and the printing unit 12 relatively to each other in the paper conveyance direction (sub-scanning direction) just once (in other words, by means of a single sub-scan). Higher-speed printing is thereby made possible and productivity can be improved, in comparison with a shuttle type head configuration in which a recording head moves back and forth (reciprocally) in a direction (main scanning direction) which is perpendicular to the paper conveyance direction.

The terms "main scanning direction" and "sub-scanning direction" are used in the following senses. More specifically, in a full-line head including rows of nozzles that have a length corresponding to the entire width of the recording paper, "main scanning" is defined as printing one line (a line formed of a row of dots, or a line formed of a plurality of rows of dots) in the width direction of the recording paper (the direction perpendicular to the conveyance direction of the recording paper) by driving the nozzles in accordance with one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while the full-line head and the recording paper are moved relatively to each other. The direction in which sub-scanning is performed is called the sub-scanning direction. Consequently, the conveyance direction of the recording paper is called the sub-scanning direction and the direction perpendicular to the sub-scanning direction is called the main scanning direction.

Although a configuration with four standard colors, K M C and Y, is described in the present embodiment, the combinations of the ink colors and the number of colors are not limited to the present embodiment, and light and/or dark inks can be added as required. For example, a configuration is possible in which print heads for ejecting light-colored inks such as light cyan and light magenta are added.

As shown in FIG. 1, the ink storing and loading unit 14 has ink tanks for storing the inks of the colors corresponding to the print heads 12K, 12C, 12M, and 12Y, and the tanks are connected to the print heads 12K, 12C, 12M, and 12Y via channels (not shown), respectively. The ink storing and loading unit 14 has a warning device (for example, a display device, an alarm sound generator, or the like) for warning when the remaining amount of any ink is low, and has a mechanism for preventing loading errors among the colors.

The print determination unit 24 has an image sensor (line sensor and the like) for capturing an image of the ink-droplet deposition result by the printing unit 12, and functions as a device to check for ejection defects such as blockages of the nozzles in the printing unit 12 according to the ink-droplet deposition results evaluated by the image sensor.

The print determination unit 24 in the present embodiment is configured with at least a line sensor having rows of photoelectric transducing elements with a width that is greater than the ink-droplet ejection width (image recording width) of the print heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements that are arranged two-dimensionally.

The print determination unit 24 reads a test pattern image printed by the print heads 12K, 12C, 12M, and 12Y for the colors, and determines the ejection by each head. The ejection determination includes the presence of the ejection, measurement of the dot size, and measurement of the dot deposition position.

A post-drying unit 42 is located following the print determination unit 24. The post-drying unit 42 is a device to dry the printed image surface, and includes a heating fan, for example. It is preferable to avoid contact with the printed surface until the printed ink dries, and therefore a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is located following the post-drying unit 42. The heating/pressurizing unit 44 is a device to control the glossiness of the image surface. The image surface is pressed with a pressure roller 45 having a predetermined uneven surface shape while the image surface is heated, and consequently the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is located directly before the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown, the paper output unit 26A for the target prints is provided with a sorter for collecting prints according to print orders.

Figure 3:
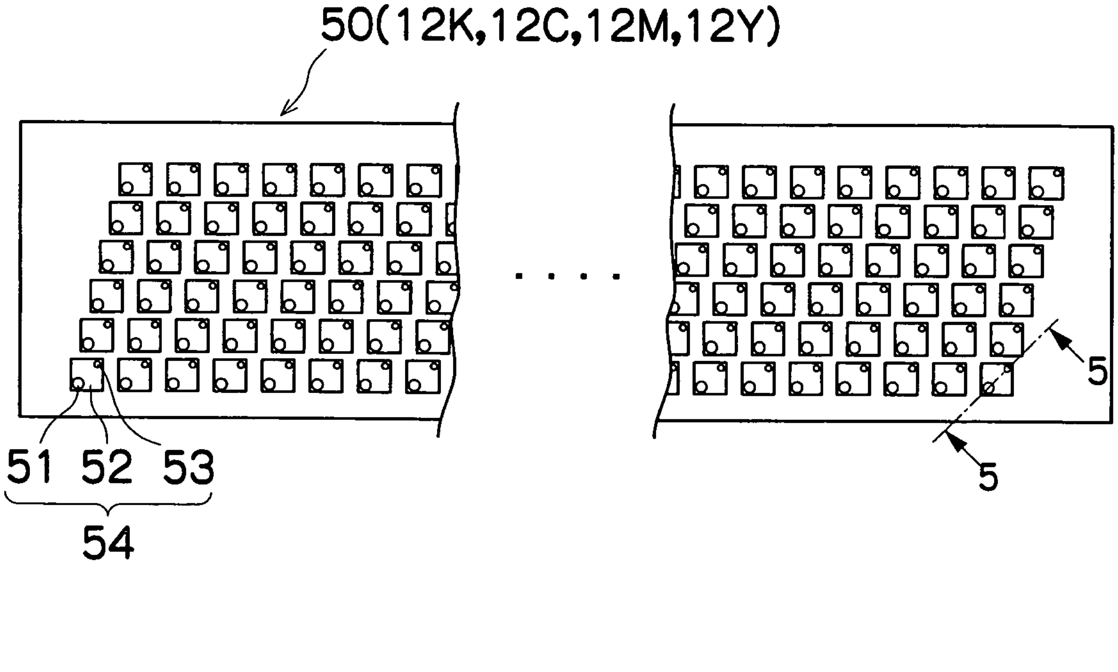
FIG. 3 is a plan perspective diagram showing an example of the structure of a print head.

Next, the arrangement of nozzles (liquid ejection ports) in the print head (liquid ejection head) is described below. The print heads 12K, 12C, 12M, and 12Y provided for the ink colors have the same structure, and a print head indicated by the reference numeral 50 represents these print heads. FIG. 3 shows a plan view perspective diagram of the print head 50.

As shown in FIG. 3, the print head 50 according to the present embodiment achieves a high density arrangement of nozzles 51 by arranging pressure chamber units 54 in a two-dimensional staggered matrix array. Each of the pressure chamber units 54 includes a nozzle for ejecting ink as ink droplets, a pressure chamber 52 for applying pressure to the ink in order to eject ink, and an ink supply port 53 for supplying ink to the pressure chamber 52 from a liquid supply chamber (not shown in FIG. 3).

In the example shown in FIG. 3, each of the pressure chambers 52 has an approximately square planar shape when viewed from above; however, the planar shape of the pressure chambers 52 is not limited to a square shape. As shown in FIG. 3, a nozzle 51 is formed at one end of a diagonal of each pressure chamber 52, and an ink supply port 53 is provided at the other end thereof.

Figure 4:
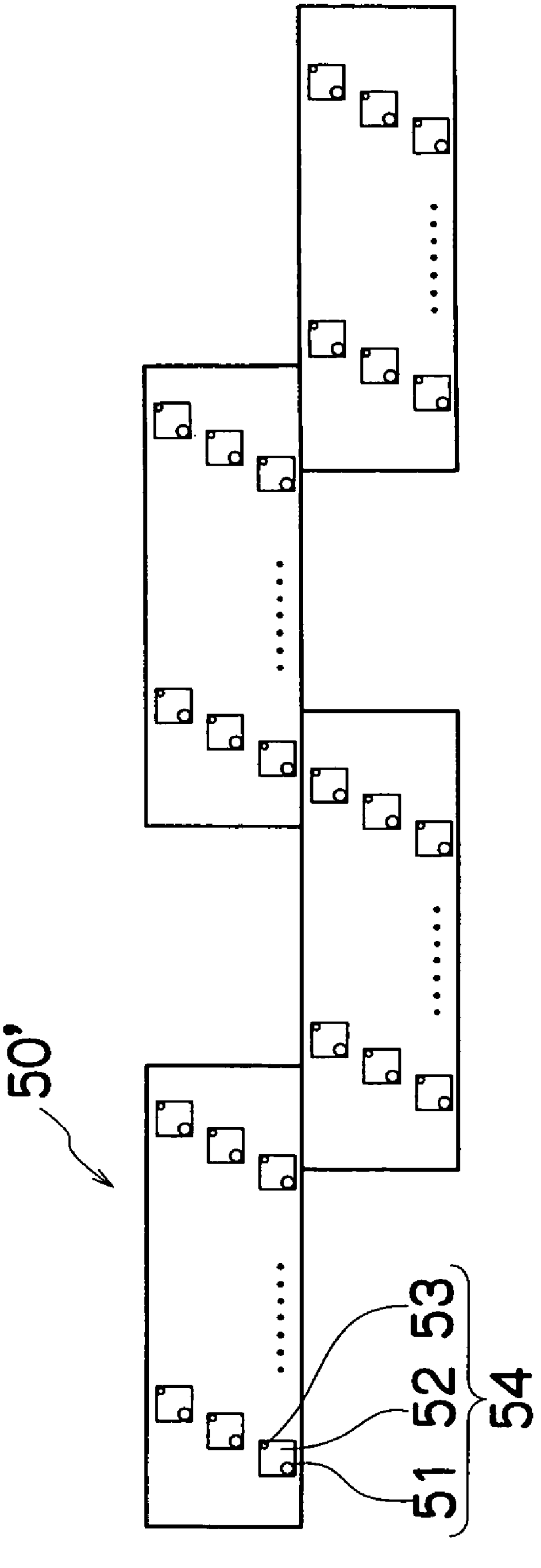
FIG. 4 is a plan view showing another example of a print head.

Moreover, FIG. 4 is a plan view perspective diagram showing another example of the structure of the print head. As shown in FIG. 4, one long full line head may be constituted by combining a plurality of short heads 50' arranged in a two-dimensional staggered array, in such a manner that the combined length of this plurality of short heads 50' corresponds to the full width of the print medium.

Figure 5:
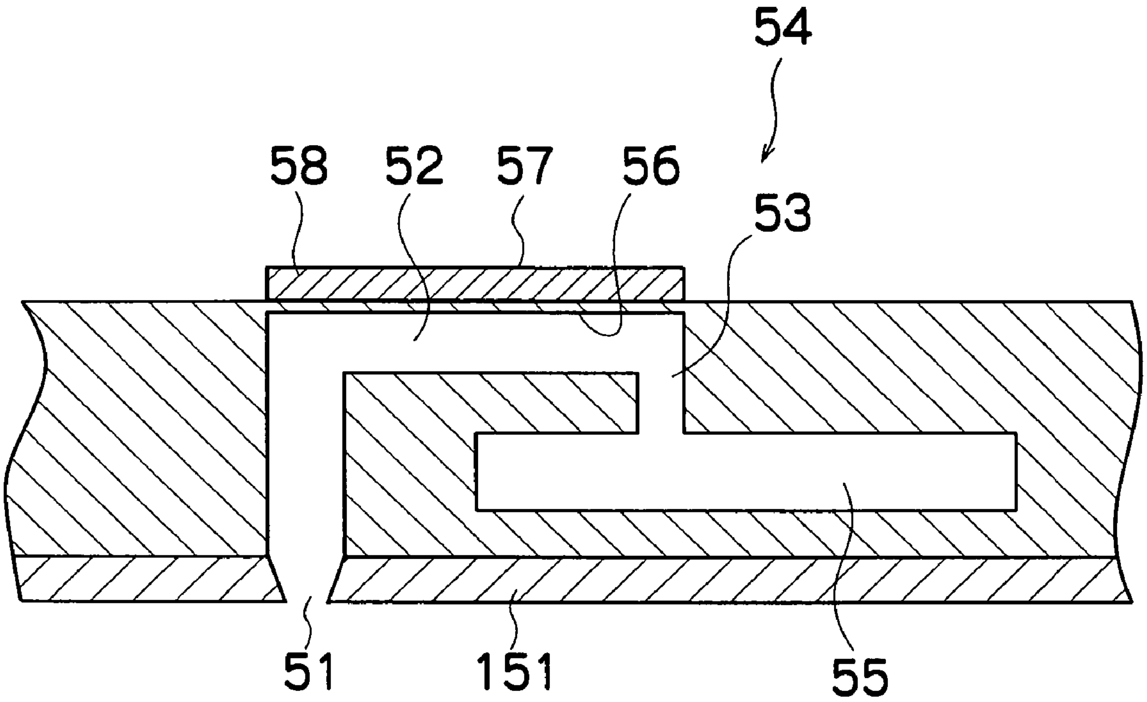
FIG. 5 is a cross-sectional diagram along line 5-5 in FIG. 3.

Furthermore, FIG. 5 shows a cross-sectional diagram along line 5-5 in FIG. 3.

As shown in FIG. 5, in the pressure chamber unit 54, a nozzle plate 151 is formed in which nozzles 51 for ejecting ink are formed on the bottommost layer. Each of the pressure chamber units 54 is formed principally by the nozzle 51 and the pressure chamber 52 connected to the nozzle 51. Furthermore, as well as being connected to a nozzle 51, the pressure chamber 52 is also connected to the supply liquid chamber 55 which supplies ink via an ink supply port 53. Furthermore, one surface (the ceiling in the diagram) of the pressure chamber 52 is constituted by a diaphragm 56, and a piezoelectric element 58 which causes the diaphragm 56 to deform by applying a pressure to the diaphragm 56 is bonded on top of the diaphragm 56, and an individual electrode 57 is formed on the upper surface of the piezoelectric element 58. Furthermore, the diaphragm 56 also serves as a common electrode.

The piezoelectric element 58 is sandwiched between the common electrode (diaphragm 56) and the individual electrode 57, and deforms when a drive voltage is applied to these two electrodes 56 and 57. The diaphragm 56 is pressed by the deformation of the piezoelectric element 58, so that the volume of the pressure chamber 52 is reduced and ink is ejected from the nozzle 51. If the voltage applied between the two electrodes 56 and 57 is released, then the piezoelectric element 58 returns to its original position, the volume of the pressure chamber 52 returns to its original size, and accordingly new ink is supplied into the pressure chamber 52 from the liquid supply chamber 55 via the supply port 53.

Figure 6:
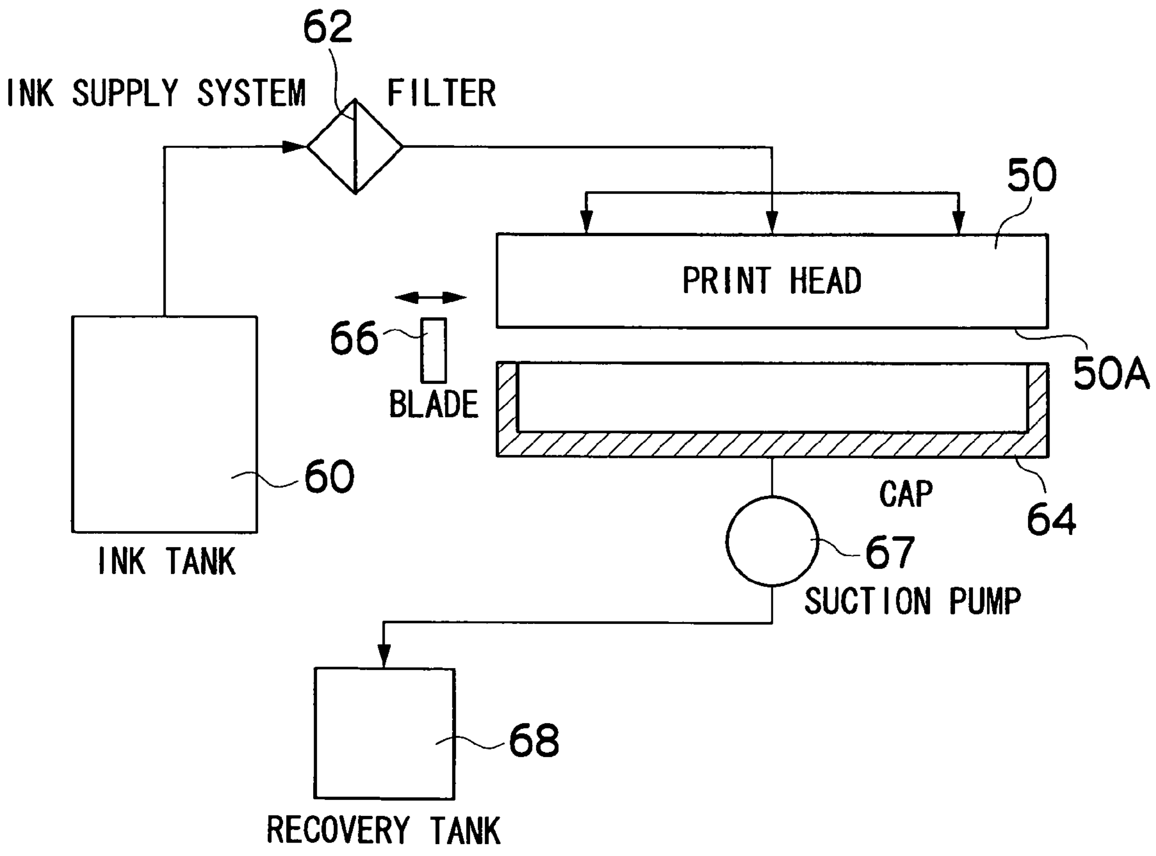
FIG. 6 is a schematic drawing showing the composition of an ink supply system in the inkjet recording apparatus.

FIG. 6 is a schematic drawing showing the configuration of the ink supply system in the inkjet recording apparatus 10. The ink tank 60 is a base tank to supply ink to the print head 50 and is set in the ink storing and loading unit 14 described with reference to FIG. 1. The examples of the ink tank 60 include a refillable type and a cartridge type: when the remaining amount of ink is low, the ink tank 60 of the refillable type is filled with ink through a filling port (not shown) and the ink tank 60 of the cartridge type is replaced with a new one. In view of changing the ink type in accordance with the intended application, the cartridge type is suitable, and it is preferable to represent the ink type information with a bar code or the like on the cartridge, and to perform ejection control in accordance with the ink type. The ink tank 60 in FIG. 6 is equivalent to the ink storing and loading unit 14 in FIG. 1 described above.

A filter 62 for removing foreign matters and bubbles is provided in the middle of the channel connecting the ink tank 60 and the print head 50 as shown in FIG. 6. The filter mesh size in the filter 62 is preferably equivalent to or less than the diameter of each nozzle of the print head 50 and commonly about 20 μm.

Although not shown in FIG. 6, it is preferable to provide a sub-tank integrally to the print head 50 or nearby the print head 50. The sub-tank has a damper function for preventing variation in the internal pressure of the head and a function for improving refilling of the print head.

The inkjet recording apparatus 10 is also provided with a cap 64 and a cleaning blade 66. The cap 64 is a device to prevent the nozzles from drying out or to prevent an increase in the ink viscosity in the vicinity of the nozzles. The cleaning blade 66 is a device to clean the nozzle face (surface of the nozzle plate 151) 50A.

A maintenance unit including the cap 64 and the cleaning blade 66 can be relatively moved with respect to the print head 50 by a movement mechanism (not shown), and is moved from a predetermined holding position to a maintenance position below the print head 50 as required.

The cap 64 is displaced upward and downward in a relative fashion with respect to the print head 50 by an elevator mechanism (not shown). When the power of the inkjet recording apparatus 10 is switched off or when the apparatus is in a standby state for printing, the elevator mechanism raises the cap 64 to a predetermined elevated position so as to come into close contact with the print head 50, and the nozzle region of the nozzle surface 50A is thereby covered by the cap 64.

The cleaning blade 66 is composed of rubber or another elastic member, and can slide on the ink ejection surface (nozzle surface 50A) of the print head 50 by means of a blade movement mechanism (not shown). If there are ink droplets or foreign matter adhering to the nozzle surface 50A, then the nozzle surface 50A is wiped by causing the cleaning blade 66 to slide over the nozzle surface 50A, thereby cleaning the nozzle surface 50A.

During printing or during standby, if the use frequency of a particular nozzle 51 has declined and the ink viscosity in the vicinity of the nozzle 51 has increased, then a preliminary ejection is performed toward the cap 64 in order to remove the ink that has degraded as a result of increasing in viscosity.

If bubbles have become intermixed in the ink inside the print head 50 (the ink inside the pressure chambers 52), then the cap 64 is placed on the print head 50, ink (ink in which bubbles have become intermixed) inside the pressure chambers 52 is removed by suction with a suction pump 67, and the ink removed by suction is sent to a recovery tank 68. This suction operation is also carried out in order to suck and remove degraded ink which has hardened due to increasing in viscosity, when ink is loaded into the print head for the first time, and when the print head starts to be used after having been out of use for a long period of time.

More specifically, when a state in which ink is not ejected from the print head 50 continues for a certain amount of time or longer, the ink solvent in the vicinity of the nozzles 51 evaporates and ink viscosity increases. In such a state, ink can no longer be ejected from the nozzle 51 even if the pressure generating device for the ejection driving (not shown but described later) is operated. Before reaching such a state (in a viscosity range that allows ejection by the operation of the pressure generating device) the pressure generating device is operated to perform the preliminary discharge to eject the ink whose viscosity has increased in the vicinity of the nozzle toward the ink receptor. After the nozzle face 50A is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as “dummy discharge”, “purge”, “liquid discharge”, and so on.

When bubbles have become intermixed in the nozzle 51 or the pressure chamber 52, or when the ink viscosity inside the nozzle 51 has increased over a certain level, ink can no longer be ejected by the preliminary discharge, and a suctioning action is carried out as above.

More specifically, when bubbles have become intermixed in the ink inside the nozzle 51 and the pressure chamber 52, ink can no longer be ejected from the nozzle 51 even if the pressure generating device is operated. Also, when the ink viscosity inside the nozzle 51 has increased over a certain level, ink can no longer be ejected from the nozzle 51 even if the pressure generating device is operated. In cases of this kind, a cap 64 is placed against the nozzle surface 50A of the print head 50, and an operation of suctioning the ink containing air bubbles or the ink of increased viscosity inside the pressure chamber 52 by the suction pump 67 is carried out.

Since this suction action is performed with respect to all the ink in the pressure chambers 52, the amount of ink consumption is considerable. Therefore, a preferred example is one in which a preliminary discharge is performed when the increase in the viscosity of the ink is small. The cap 64 illustrated in FIG. 6 functions as a suctioning device and it may also function as an ink receptacle for preliminary ejection.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

Figure 7:
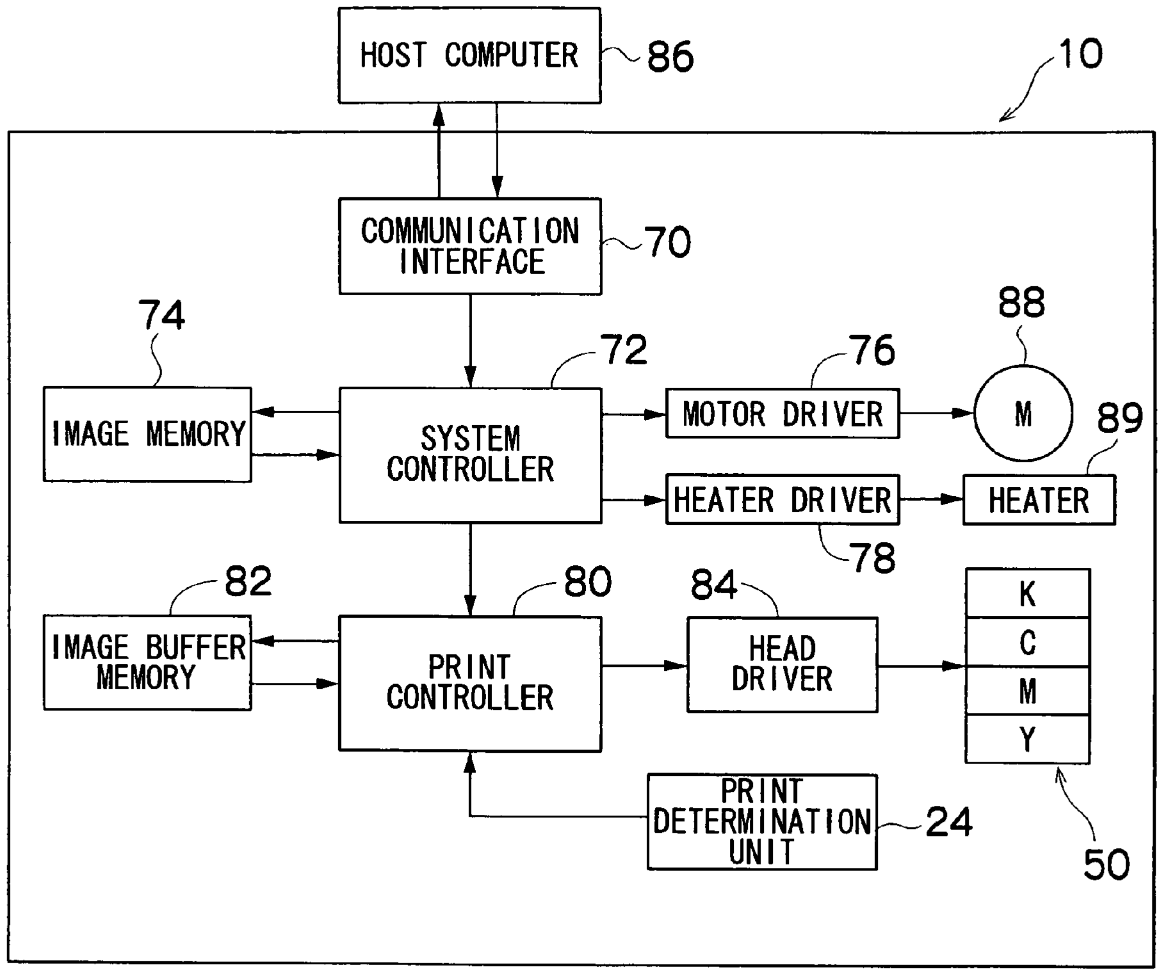
FIG. 7 is a partial block diagram showing the system composition of the inkjet recording apparatus.

FIG. 7 is a principal block diagram showing the system configuration of the inkjet recording apparatus 10.

As shown in FIG. 7, the inkjet recording apparatus 10 includes a communication interface 70, a system controller 72, an image memory 74, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is a control unit for controlling the various sections, such as the communications interface 70, the image memory 74, the motor driver 76, the heater driver 78, and the like. The system controller 72 is constituted by a central processing unit (CPU) and peripheral circuits thereof, and the like. In addition to controlling communications with the host computer 86 and controlling reading and writing from and to the image memory 74, or the like, the system controller 72 also generates a control signal for controlling the motor 88 of the conveyance system and the heater 89.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 to supply the generated print control signal (print data) to the head driver 84. Required signal processing is carried out in the print controller 80, and the ejection amount and the ejection timing of the ink droplets from each of the print heads 50 are controlled via the head driver 84, on the basis of the print data. By this means, desired dot size and dot positions can be achieved.

The print controller 80 is provided with the image buffer memory 82. Image data, parameters, and other data are temporarily stored in the image buffer memory 82 when image data is processed in the print controller 80. The example shown in FIG. 7 is one in which the image buffer memory 82 accompanies the print controller 80; however, the image memory 74 may also serve as the image buffer memory 82. Also possible is an example in which the print controller 80 and the system controller 72 are integrated to form a single processor.

The head driver 84 drives the pressure generating device of the print head 50 for each color, on the basis of print data supplied by the print controller 80. The head driver 84 can include a feedback control system for keeping the drive conditions for the print heads constant.

The print determination unit 24 is a block that includes the line sensor (not shown) as described above with reference to FIG. 1, reads the image printed on the recording paper 16, determines the print conditions (presence of the ejection, variation in the dot formation, and the like) by performing desired signal processing, or the like, and provides the determination results of the print conditions to the print controller 80.

According to requirements, the print controller 80 makes various corrections with respect to the print head 50 on the basis of information obtained from the print determination unit 24.

Next, a method of forming a liquid-repelling film on the nozzle plate 151 is described below.

FIGS. 8A to 8E show steps for forming a liquid-repelling film on the surface of a nozzle plate 151.

Figures 8A, 8B, 8C, 8D, 8E, 8F:
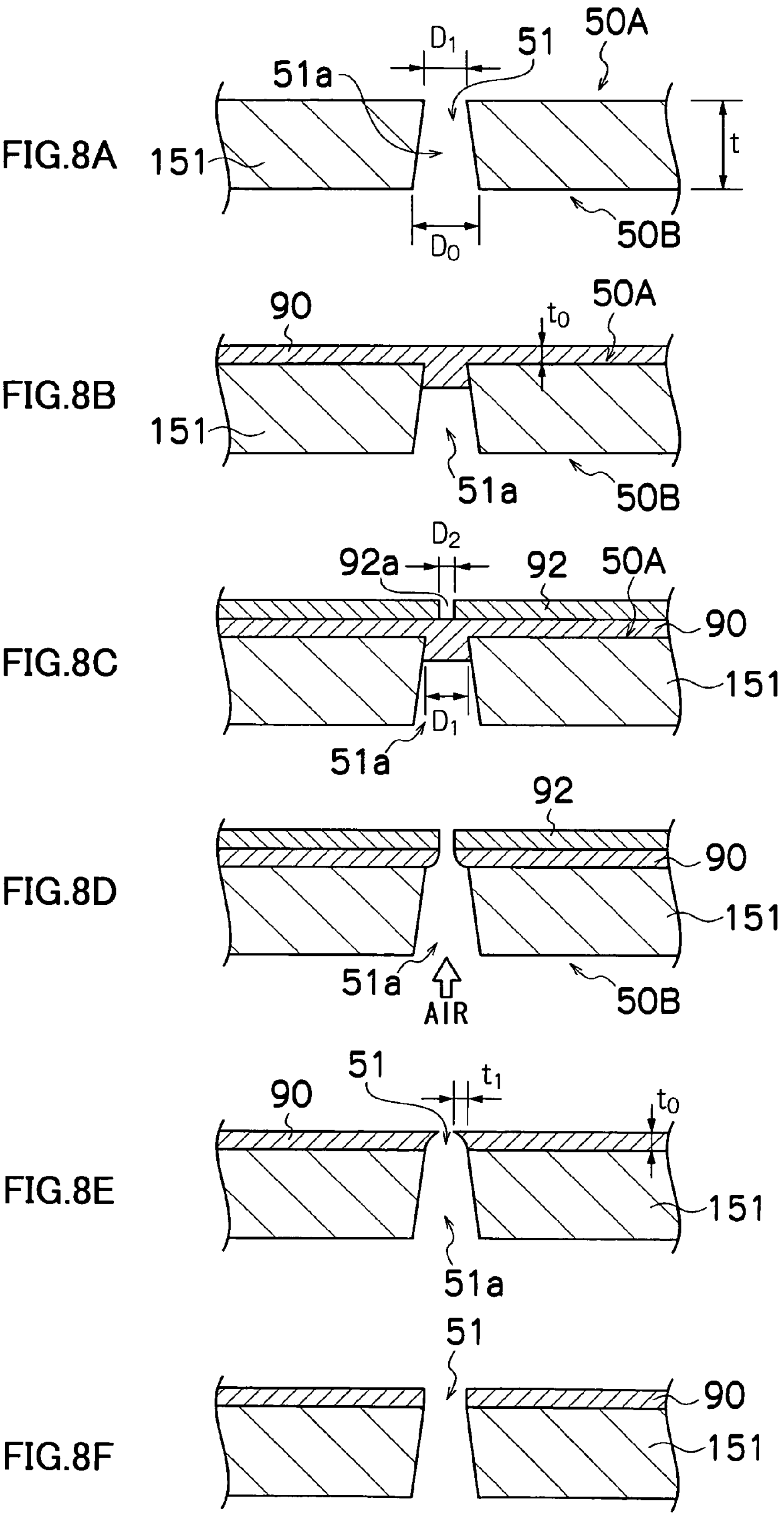
FIGS. 8A to 8F are illustrative diagrams showing a process of manufacturing the nozzle plate according to the present invention.

Firstly, as shown in FIG. 8A, nozzle holes 51*a* that are to form nozzles 51 are opened in the nozzle plate 151. There are no particular restrictions on the method used to open the nozzle holes 51*a*. For example, the holes may be formed by drilling, wet etching, dry etching, laser processing, electroforming (forging), punching, or the. like. There are no particular restrictions on the material of the nozzle plate 151; however, desirably, the removal property of the nozzle plate 151 is inferior to that of the liquid-repelling film, which is subsequently applied to the surface of the nozzle plate 151. More specifically, desirably, it is more difficult to remove the nozzle plate 151 than to remove the liquid-repelling film. For example, the material of the nozzle plate 151 may be stainless steel, nickel, nickel alloy, a semiconductor such as silicon, or the like.

The thickness t of the nozzle plate 151 is 10 μm to 100 μm (t=10 μm to 100 μm). Furthermore, the nozzle holes 51*a* are formed in such a manner that the diameter $D_1$ of each nozzle at the nozzle surface 50A at the front end of the nozzles where ink is to be ejected is equal to or smaller than the diameter $D_0$ of each nozzle at the rear face 50B of the nozzle plate 151 at the base side (namely, $D_1 \leqq D_0$).

Next, as shown in FIG. 8B, a liquid-repelling film 90 is applied to the nozzle plate 151 in which the nozzle holes 51*a* have been formed, on the nozzle surface 50A side of the plate. Thereby, the liquid-repelling film 90 enters into the nozzle holes 51*a* opened in the nozzle plate 151. There are no particular restrictions on the material of the liquid-repelling film 90. An epoxy-type or akyl-type resin, silicon type resin, or the like, may be used as the liquid-repelling film 90, for example.

The thickness to of the liquid-repelling film 90 on the nozzle surface 50A is 0.2 μm through 5 μm. From the viewpoint of scratch resistance, it is desirable that the liquid-repelling film 90 should have a large thickness. Taking the actual film formation processing, such as coating, spin coating, and the like, into consideration, it is difficult to form a thick film. Hence, the film is set to a thickness of about 0.5 μm to 2 μm, in general.

In advance, the liquid-repelling film 90 applied to the nozzle plate 151 is hardened to a certain degree by provisional curing. For example, it is semi-cured for approximately one hour at a temperature of 100° C.

Next, as shown in FIG. 8C, a mask 92 is placed over the liquid-repelling film 90. Holes 92*a* are formed in the mask 92, in positions corresponding to the nozzle holes 51*a*. The diameter $D_2$ of each hole 92*a* in the mask 92 is smaller than the diameter $D_1$ of each nozzle 51*a* at the nozzle surface 50A (namely, $D_2 < D_1$). The diameter $D_2$ of the holes in the mask 92 is made smaller than the diameter $D_1$ of the holes in the nozzle. plate 151 in this way, in order to absorb errors or disagreements in the positioning of the mask 92 with respect to the nozzle plate 151.

As a method of providing the mask 92 on the liquid-repelling film 90, a separate member in which a pattern of the holes 92*a* and the like is formed, may be placed onto the liquid-repelling film 90 so as to contact with the liquid-repelling film 90, or the mask 92 (or the holes 92*a*) may be formed directly on the liquid-repelling film 90. The method where a separate member is pressed onto the plate is excellent in terms of workability and productivity, compared to the method where the mask 92 is formed directly on the liquid-repelling film 90.

As the method where a mask 92 is formed directly on the liquid-repelling film 90, a method where a resist film is formed on the liquid-repelling film 90 and then exposed and developed, a nano-imprint method where a metal mold having a very fine structure is pressed on a high-polymer resin and thereby the fine structure of the metal mold is transferred on the resin as a resist, a metal coating method using nickel, copper, or the like, may be adopted. According to the method using the metal coating, there is little deformation of the mask 92 in the subsequent step of removing unwanted portions of the liquid-repelling film 90. According to the nano-imprint method, steps for exposure and development of resist are not required, and therefore efficiency is good.

Next, as shown in FIG. 8D, air, for example, is blown from the rear face 50B side of the nozzle plate 151, thereby removing the unwanted portions of the liquid-repelling film 90 corresponding to the regions of the nozzle holes 51*a*. The step of removing the unwanted portions of the liquid-repelling film 90 is not limited to the process using air, and it is also possible to use various other methods, such as blasting, a water jet, or the like. It is particularly desirable to use a gas (e.g., air, nitrogen gas, or an inert gas, such as helium or argon) which gives little damage to the nozzle plate 151. Furthermore, in order to improve the workability of the removal step, in the step of the semi-curing of the liquid-repelling film 90 carried out as described above, the liquid-repelling film 90 is cured to a degree where the liquid-repelling film 90 is softer than the mask 92 so that the liquid-repelling film 90 is removed more easily than the mask 92.

Subsequently, the mask 92 is removed, and main curing is carried out at a temperature of approximately 200° C., for example, thereby curing the liquid-repelling film 90 completely. Consequently, the nozzles 51 are created so that the liquid-repelling film 90 is formed on the surface of the nozzle plate 151, as shown in FIG. 8E. In this case, as stated previously, the diameter $D_1$ of the nozzle hole 51*a* at the front end side is smaller than the hole diameter $D_2$ in the mask 92 (see FIG. 8C), and hence the cross-section of the liquid-repelling film 90 is formed in a tapered shape which becomes narrower toward the outer side.

In this example, as shown in FIG. 8E, the ratio between the length $t_1$ in the horizontal direction of the front end of the tapered portion of the liquid-repelling film 90, and the thickness $t_0$ of the liquid-repelling film 90, namely, $t_1/t_0$, is equal to or less than $1(t_{1/t0} \leqq 1)$. The length $t_1$ in the horizontal direction of the front end of the tapered portion of the liquid-repelling film 90 indicates the length of the extending part of the liquid-repelling film 90 at the front end of the tapered portion, and the length $t_1$ is equal to half of the difference between the hole diameter $D_1$ of the nozzle hole 51*a* and the hole diameter $D_2$ of the mask 92. In other words, the following relationship is satisfied: $t_1=(D_1-D_2)/2$.

The condition of $t_1/t_0 \leqq 1$ means that the angle formed by the inclined face of the tapered shape of the liquid-repelling film 90 at the nozzle section 51 with respect to the vertical, is equal to or less than 45°. By reducing the angle in this way, the strength of the tapered section is reinforced, and it is possible to prevent the front end portions of the tapered shape from becoming very fine and easily breakable.

In this way, if the hole diameter $D_2$ of the mask 92 is smaller than the hole diameter $D_1$ of the nozzle holes 51*a*, then nozzles 51 which have a tapered cross-section at the front end thereof are obtained. In contrast, if the hole diameter $D_2$ of the mask 92 is equal to the hole diameter $D_1$ of the nozzle holes 5l*a*, then nozzles 51 which have a perpendicular cross-section at the front end thereof, as shown in FIG. 8F, are obtained.

According to the method described above, the mask 92 is placed on the surface of the nozzle plate 151 having the liquid-repelling film 90 formed on the nozzle surface 50A thereof (in other words, placing the mask 92 on top of the liquid-repelling film 90), and then the liquid-repelling film 90 removal process where air, for example, is blown from the rear face 50B side of the nozzle plate 151 is carried out. Accordingly, the mask 92 protects the liquid-repelling film 90 and it is possible to prevent the occurrence of burring of the liquid-repelling film 90.

Furthermore, in the step of removing the liquid-repelling film 90, which is carried out from the rear surface side of the nozzle plate 151, if it is considered that a mask 92 is disposed on the downstream side of the liquid-repelling film 90 with respect to the direction in which the air, or the like, is blown, and the nozzle plate 151 serves as a mask on the upstream side of the liquid-repelling film 90, then the removal process is carried out while the liquid-repelling film 90 is sandwiched between the masks on either side thereof.

Moreover, as stated previously, if the hole diameter $D_2$ of the mask 92 is smaller than the hole diameter $D_1$ of the nozzle plate 151, then the nozzles 51 have a structure where each nozzle becomes finer towards the front end, accordingly facilitating keeping of the meniscus position and allowing ejection stability to be ensured.

Next, a further method of forming a liquid-repelling film on the nozzle plate 151 is described below.

Figure 9A:
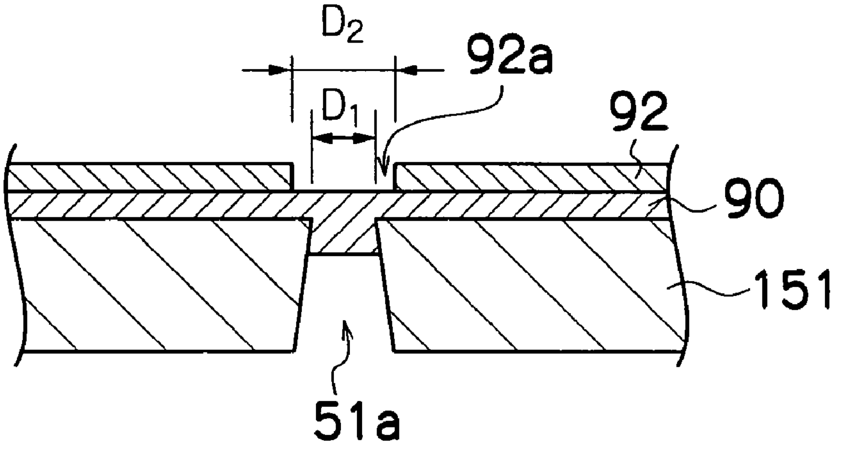
FIGS. 9A to 9C are illustrative diagrams showing another process of manufacturing the nozzle plate according to the present invention.
Figure 9B:
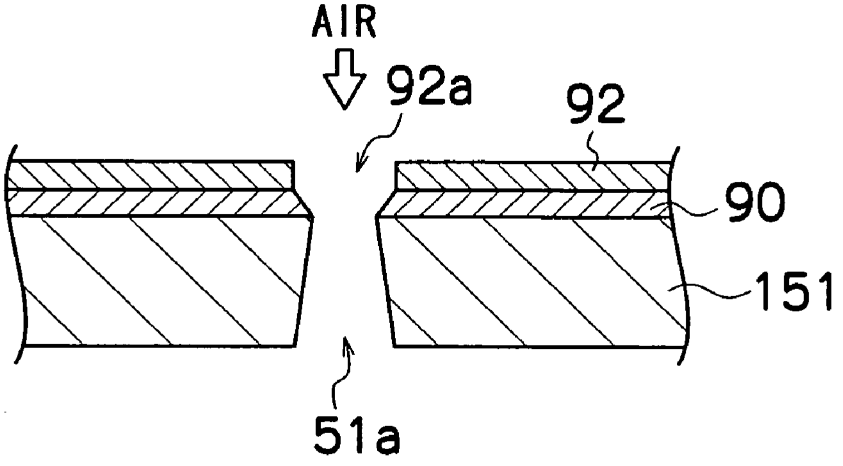
Figure 9C:
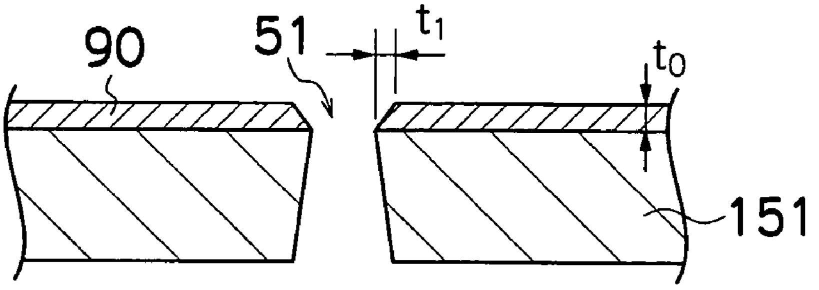

FIGS. 9A to 9C show a further method of forming a liquid-repelling film.

This method is similar to the method described above, up to forming the liquid-repelling film 90 on the surface of the nozzle plate 151 formed with taper-shaped nozzle holes 51*a*, and placing the mask 92 on top of the liquid-repelling film. However, in the case of this method, as shown in FIG. 9A, the diameter $D_2$ of the hole formed in the mask 92 is greater than the diameter $D_1$ of the nozzle holes 51*a* at the front ends of the nozzles (i.e., $D_1<D_2$).

Then, as shown in FIG. 9B, the step of removing unwanted portions of the liquid-repelling film 90 by blowing air, or the like, is carried out from the side of the mask 92. In this way, the present method differs from the previous example in that the removal of the liquid-repelling film 90 is performed from the surface side of the nozzle plate 151 where the mask 92 is formed, rather than from the rear face side of the plate as in the previous example.

By performing the removal step from the side of the mask 92 on the surface of the nozzle plate 151 in this way, the cross-section of the nozzle 51 sections of the liquid-repelling film 90 is a tapered shape which is the reverse of the shape of the previous example and broadens towards the front end side as shown in FIG. 9C. In this case, the length $t_1$ in the horizontal direction of the front end of the tapered portion indicates the length by which the front end of the tapered portion of the liquid-repelling film 90 is withdrawn in the horizontal direction. Moreover, similarly to the previous example, this length $t_1$ is given by one half of the difference between the hole diameter $D_2$ formed in the mask 92 and the diameter $D_1$ of the front end sections of the nozzle holes 51*a*, in other words, the following relationship is satisfied: $t_1=(D_2-D_1)/2$. Furthermore, the liquid-repelling film 90 is formed in such a manner that the ratio between this length $t_1$ and the thickness $t_0$ of the liquid-repelling film 90, namely, $t_1/t_0$, is equal to or less than 1 (i.e., $t_1/t_0 \leqq 1$). Accordingly, similarly to the previous example, the angle formed by the inclined surface of the tapered section with respect to the vertical direction is equal to or less than 45°.

Accordingly, the nozzle 51 sections (tapered sections) of the nozzle plate 151 do not become excessively thin, and the strength of the nozzle plate 151 can be ensured.

In the process of removing unwanted portions of the liquid-repelling film 90 in this case, it can be considered that the mask on the upstream side of the liquid-repelling film 90, in terms of the direction in which the air, or the like, is blown, is the mask 92, and the mask on the downstream side is the nozzle plate 151. Therefore, in this case also, the removal step is carried out while the liquid-repelling film 90 is sandwiched between the masks on either side thereof.

Figure 10:
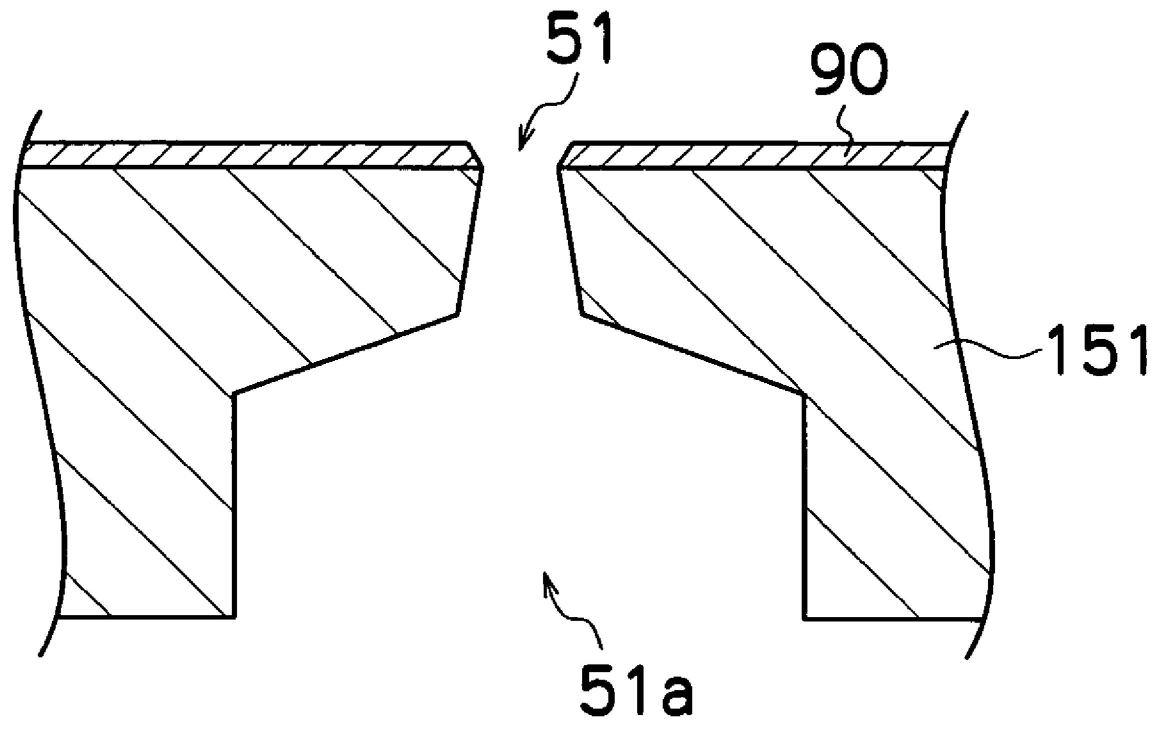
FIG. 10 is a cross-sectional view showing another example of the nozzle plate.

In any of the methods described above, the shape of the nozzle plate 151 is not limited to that of a plate having taper-shaped nozzle holes 5l*a*. As shown in FIG. 10, for example, the nozzle holes 51*a* may have a stepped shape, rather than a tapered shape.

Pressure chamber units 54 are formed by bonding the nozzle plate 151 formed in this way with a composition unit including pressure chambers 52 and the like as shown in FIG.

5. Moreover, a liquid ejection head (print head 50) is formed by connecting wiring members, and the like, to these pressure chamber units 54.

Figure 11A:
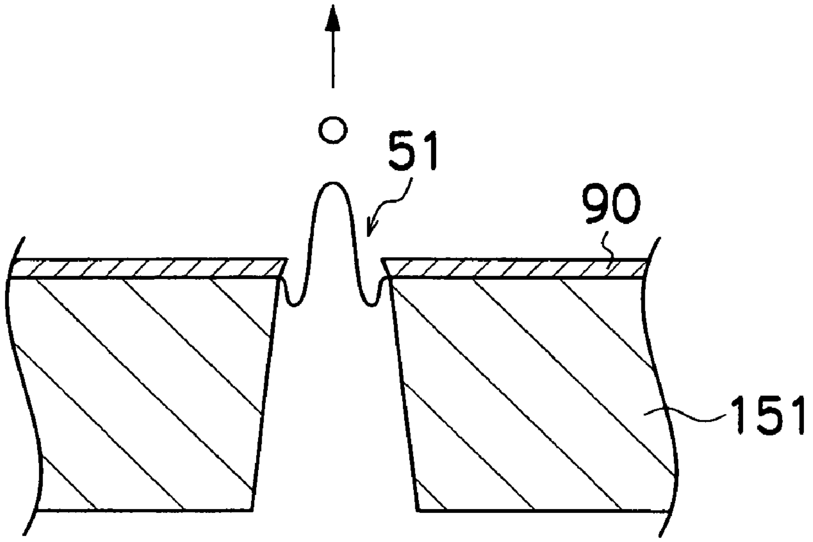
FIGS. 11A and 11B are illustrative diagrams showing a state of ink ejection.
Figure 11B:
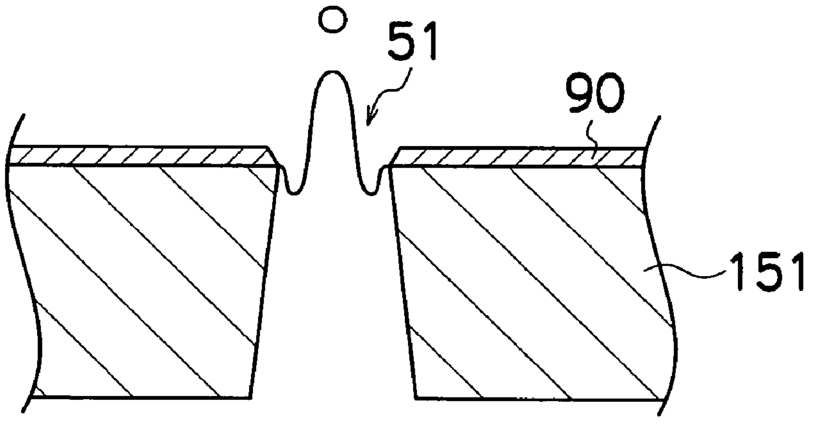

FIGS. 11A and 11B show the state of ink ejection by the print head 50 formed in this way. F*ig*. 11A shows a case using the nozzle plate 151 formed by the method described initially, which has the liquid-repelling film 90 formed at the nozzle sections 51 having a cross-section with a taper that becomes finer toward the front end thereof. Furthermore, FIG. 11B shows a case using the nozzle plate 151 formed by the latter method, which has a liquid-repelling film 90 formed at the nozzle sections 51 having a cross-sectional with an inverse taper that becomes broader toward the front end thereof.

As shown in these diagrams, in either of these cases, the meniscus surface can be held readily at the interface between the liquid-repelling film 90 at the nozzle 51 and the nozzle plate 151, and the meniscus is stabilized. Accordingly, the motion of the meniscus surface is curbed and the meniscus surface recovers rapidly after droplet ejection, and therefore high-frequency ejection becomes possible.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a nozzle plate, comprising the steps of:

providing at least one nozzle hole in a nozzle plate;

providing a liquid-repelling film on a first surface of the nozzle plate, the liquid-repelling film being provided so as to block the at least one nozzle hole provided in the nozzle plate;

performing semi-curing of the liquid-repelling film provided on the first surface of the nozzle plate and blocking said at least one nozzle hole;

providing a mask having at least one mask hole on the semi-cured liquid-repelling film so that the at least one mask hole is in a position corresponding to a position of the at least one nozzle hole;

after providing the mask having the at least one mask hole, applying a forced flow of material to the semi-cured liquid-repelling film at least in a region of the semi-cured liquid repelling film blocking the at least one nozzle hole to form at least one film hole in the semi-cured liquid-repelling film to unblock the at least one nozzle hole so as to provide a nozzle able to eject a liquid;

removing the mask after forming the at least one film hole; and performing full-curing of the semi-cured liquid-repelling film after removing the mask.

2. The method as defined in claim 1, wherein the forced flow of the material is applied from a side of the nozzle plate opposite to the first surface.

3. The method as defined in claim 2, wherein when $D_1$ represents a diameter of the at least one nozzle hole of the nozzle and $D_2$ represents a diameter of the at least one mask hole of the mask, then the following relationship is satisfied: $D_2 < D_1$.

4. The method as defined in claim 1, the forced flow of the material is applied from the first surface side of the nozzle plate.

5. The method as defined in claim 4, wherein when $D_1$ represents a diameter of the at least one nozzle hole of the nozzle and $D_2$ represents a diameter of the at least one mask hole of the mask, then the following relationship is satisfied: $D_2 < D_1$.

6. The method as defined in claim 1, wherein when $D_1$ represents a diameter of the at least one nozzle hole of the nozzle, $D_2$ represents a diameter of the at least one mask hole of the mask, $t_0$ represents a thickness of the liquid-repelling film, and $t_1$ satisfies $t_1 = |D_1 - D_2|/2$, then the following relationship is satisfied: $t_1/t_0 \leqq 1$.

7. The method as defined in claim 1, wherein a material of the nozzle plate is a metal.

8. The method as defined in claim 1, wherein a material of the nozzle plate is a semiconductor.

9. The method as defined in claim 1, wherein the material of the applied forced flow is a micro-particle.

10. The method as defined in claim 1, wherein the material of the applied forced flow is a fluid.

11. The method as defined in claim 10, wherein the fluid is at least one of air, a nitrogen gas, and an inert gas.

* * * * *